United States Patent
Hou et al.

(10) Patent No.: US 12,259,843 B2
(45) Date of Patent: Mar. 25, 2025

(54) TRANSMISSION DEVICE AND COMMUNICATION SYSTEM FOR ARTIFICIAL INTELLIGENCE CHIPS

(71) Applicant: Huawei Technologies Co., Ltd., Shenzhen (CN)

(72) Inventors: Xinyu Hou, Shenzhen (CN); Qun Jia, Shenzhen (CN); Weibin Lin, Hangzhou (CN)

(73) Assignee: HUAWEI TECHONLOGIES CO., LTD., Shenzhen (CN)

( * ) Notice: Subject to any disclaimer, the term of this patent is extended or adjusted under 35 U.S.C. 154(b) by 71 days.

(21) Appl. No.: 17/561,019

(22) Filed: Dec. 23, 2021

(65) Prior Publication Data

US 2022/0114132 A1    Apr. 14, 2022

Related U.S. Application Data

(63) Continuation of application No. PCT/CN2020/078029, filed on Mar. 5, 2020.

(30) Foreign Application Priority Data

Jun. 28, 2019    (CN) .......................... 201910583787.1

(51) Int. Cl.
*G06F 13/42*    (2006.01)
*G06F 13/40*    (2006.01)
(Continued)

(52) U.S. Cl.
CPC ...... *G06F 13/4282* (2013.01); *G06F 13/4022* (2013.01); *G06F 2213/0026* (2013.01); *G06F 2213/0042* (2013.01)

(58) Field of Classification Search
CPC ............ G06F 13/4282; G06F 13/4022; G06F 2213/0026; G06F 2213/0042;
(Continued)

(56) References Cited

U.S. PATENT DOCUMENTS 7,882,218 B2 *  2/2011  Baier ..................... H04L 61/45
                                                         709/224
8,810,584 B2    8/2014  Kabawala
(Continued)

FOREIGN PATENT DOCUMENTS

CN    108304341 A    7/2018
CN    108845970 A    11/2018
(Continued)

*Primary Examiner* — Idriss N Alrobaye
*Assistant Examiner* — Henry W Yu
(74) *Attorney, Agent, or Firm* — Conley Rose, P.C.

(57) ABSTRACT

An artificial intelligence (AI) switch chip includes a first AI interface, a first network interface, and a controller. The first AI interface is used by the AI switch chip to couple to a first AI chip in a first server. The first network interface is used by the AI switch chip to couple to a second server. The controller receives, through the first AI interface, data from the first AI chip, and then sends the data to the second server through the first network interface. By using the AI switch chip, when a server needs to send data in an AI chip to another server, an AI interface may be used to directly receive the data from the AI chip, and then the data is sent to the other server through one or more network interfaces coupled to the controller.

20 Claims, 9 Drawing Sheets

(51) Int. Cl.
*G06F 15/17* (2006.01)
*G06F 15/173* (2006.01)
*H04L 49/109* (2022.01)

(58) Field of Classification Search
CPC ........... G06F 15/1735; G06F 15/17356; G06F 15/17; H04L 49/109
USPC .................................. 710/3, 15, 26, 33, 105
See application file for complete search history.

(56) References Cited

U.S. PATENT DOCUMENTS

| | | | |
|---|---|---|---|
| 9,614,785 B1 | 4/2017 | Palmer | |
| 10,225,005 B1* | 3/2019 | Elberbaum | H01R 27/02 |
| 2015/0039793 A1 | 2/2015 | Rossetti | |
| 2015/0143018 A1* | 5/2015 | Kim | G06F 13/4022 |
| | | | 710/316 |
| 2016/0124887 A1* | 5/2016 | Douglas | G06F 13/36 |
| | | | 710/301 |
| 2018/0212825 A1* | 7/2018 | Umbehocker | H04L 67/1097 |
| 2019/0121889 A1* | 4/2019 | Gold | G06T 1/20 |
| 2019/0140913 A1* | 5/2019 | Guim Bernat | G06N 3/105 |
| 2019/0146943 A1* | 5/2019 | Fender | G06F 30/34 |
| | | | 710/105 |
| 2019/0149426 A1* | 5/2019 | Almasan | G06F 11/3447 |
| | | | 709/224 |
| 2019/0189120 A1* | 6/2019 | Sohn | G10L 15/22 |
| 2019/0208009 A1* | 7/2019 | Prabhakaran | H04L 67/51 |
| 2020/0162337 A1* | 5/2020 | Jain | H04L 41/20 |
| 2020/0259717 A1* | 8/2020 | Ong | H04L 41/0895 |
| 2022/0197859 A1* | 6/2022 | Jurski | G06F 15/177 |

FOREIGN PATENT DOCUMENTS

| | | |
|---|---|---|
| CN | 109739802 A | 5/2019 |
| CN | 109828940 A | 5/2019 |
| IT | 1411178 B | 10/2014 |

* cited by examiner

TRANSMISSION DEVICE AND COMMUNICATION SYSTEM FOR ARTIFICIAL INTELLIGENCE CHIPS

CROSS-REFERENCE TO RELATED APPLICATIONS

This application is a continuation application of International Patent Application No. PCT/CN2020/078029 filed on Mar. 5, 2020, which claims priority to Chinese Patent Application No. 201910583787.1 filed on Jun. 28, 2019. The disclosures of the aforementioned applications are hereby incorporated by reference in their entireties.

TECHNICAL FIELD

This application relates to the server field, and in particular, to a data switch chip and a server.

BACKGROUND

With development of computer technologies, artificial intelligence (AI) and big data are widely used in more and more fields such as machine vision and natural language processing. AI is to simulate human consciousness and thinking processes, and is usually implemented by using a neural network model. An AI chip is usually used for training the neural network model. The AI chip is a module configured to process a large quantity of computing tasks in an AI application. One server may have one or more AI chips. As a requirement of an application scenario increases, a neural network scale and a data set scale increase sharply, and training the neural network model by using a single server takes a long time. To adapt to the increase of the neural network scale and the data set scale, and shorten the time for training the neural network model, AI chips in a plurality of servers usually need to be used to process data in parallel. For example, different servers are used to train different network layers of the neural network model, or different data of a same network layer is allocated to AI chips in different servers for training. Then, computing results from all servers are combined in a specific manner. However, when the plurality of servers process data in parallel, a large amount of data needs to be transmitted between different servers. How to reduce a delay of data transmission between servers is a technical problem to be solved urgently to improve parallel processing efficiency of data.

SUMMARY

This application provides a data switch chip and a server, to improve efficiency of transmitting data between servers.

According to a first aspect, this application provides an AI switch chip, including a first AI interface, a first network interface, and a controller, where the first AI interface is used by the AI switch chip to connect to a first AI chip in a first server through the first AI interface, where the first server includes the AI switch chip and a plurality of AI chips, and the first AI chip is any one of the plurality of AI chips, the first network interface is used by the AI switch chip to connect to a second server through the first network interface, and the controller is separately connected to the first AI interface and the first network interface, and configured to receive, through the first AI interface, first data sent by the first AI chip, and then send the first data to the second server through the first network interface.

By using the AI switch chip, when a server needs to send data in an AI chip to another server, the controller in the AI switch chip may use, without using another chip or module, an AI interface connected to the controller to directly receive the data sent by the AI chip. Then the data is sent to the other server through a network interface connected to the controller. This brings about a shorter delay of receiving data from an AI chip by a controller in a server, and higher efficiency.

In a possible implementation, the AI switch chip further includes a peripheral bus interface standard (for example, Peripheral Component Interconnect Express (PCIe)) interface, and the PCIe interface is separately connected to the controller and a processor in the first server.

Before receiving, through the first AI interface, the first data sent by the first AI chip, the controller is further configured to receive, through the PCIe interface, control information sent by the processor, where the control information carries an identifier (ID) of the first AI chip. That the controller receives, through the first AI interface, the first data sent by the first AI chip includes receiving, through the first AI interface based on the identifier of the first AI chip, the first data sent by the first AI chip.

In a possible implementation, the AI switch chip further includes a second network interface, and the second network interface is connected to the second server. The controller is further configured to receive, through the first AI interface, second data sent by the first AI chip, and send the second data to the second server through the second network interface. The AI switch chip includes a plurality of network interfaces. After receiving data in an AI chip, the controller in the AI switch chip may send the data to another server through the plurality of network interfaces, so that bandwidth for transmitting data between servers can be increased, and a delay of transmitting data between servers can be reduced.

In a possible implementation, the first AI interface of the AI switch chip is connected to the processor through the first AI chip. The controller is further configured to receive, through the first AI interface and the first AI chip, third data sent by the processor, and send the third data to the second server through the first network interface. The AI switch chip may receive, through the PCIe interface, data sent by the processor, or may receive, through the first AI interface and the first AI chip, the data sent by the processor. Therefore, the AI switch chip may be connected to the processor over two paths, and may receive the data in the processor through the two paths.

In a possible implementation, the controller is further configured to receive, through the first AI interface, fourth data sent by the first AI chip, and then send the fourth data to a second AI chip in the plurality of AI chips in the server through a second AI interface. The controller receives, through an AI interface, data sent by one AI chip, and then sends the data to another AI chip through another AI interface, to implement data exchange between AI chips in a server.

In a possible implementation, the first AI interface is a High-Speed Serial Interface (HSSI) interface.

According to a second aspect, this application provides a server, including a processor, a plurality of AI chips, and an AI switch chip, where the AI switch chip is connected to the processor through a first peripheral interface standard (PCIe) interface of the AI switch chip, and separately connected to the plurality of AI chips through a plurality of AI interfaces of the AI switch chip. The AI switch chip is configured to receive, through the PCIe interface, control information sent by the processor, where the control information includes an identifier of a first AI chip, and the first AI chip is any one of the plurality of AI chips, receive, through a first AI interface of the AI switch chip, first data sent by the first AI chip, and send the first data to another server through a first network interface of the AI switch chip.

In a possible implementation, the AI switch chip further includes a second network interface, and the AI switch chip is connected to another server through the second network interface. The AI switch chip is further configured to receive, through the first AI interface, second data sent by the first AI chip, and then send the second data to the other server through the second network interface.

In a possible implementation, the first AI interface is connected to the processor through the first AI chip. The AI switch chip is further configured to receive, through the first AI interface and the first AI chip, third data sent by the processor, and send the third data to the other server through the first network interface.

In a possible implementation, the AI switch chip is connected to the processor through the PCIe interface. Before the AI switch chip receives, through the first AI interface and the first AI chip, the third data sent by the processor, the processor needs to determine that data congestion exists on a path on which the processor is connected through the PCIe interface. The controller may be connected to the processor through the PCIe interface, or may be connected to the processor through the first AI interface and the first AI chip. When the AI switch chip needs to receive data in the processor, the AI switch chip may receive, through any one of the foregoing two paths, the data sent by the processor, or receive, through the foregoing two paths simultaneously, the data sent by the processor. When the controller receives, through any one of the foregoing two paths, data sent by the processor, the controller may obtain congestion conditions of the two data paths, and select a less congested data path to receive the data sent by the processor. This can reduce a delay of receiving data.

In a possible implementation, the AI switch chip may further receive fourth data in the first AI chip through a second AI interface, and send the fourth data to a second AI chip in the plurality of AI chips.

BRIEF DESCRIPTION OF DRAWINGS

To describe the technical methods in some of the embodiments of this application more clearly, the following briefly describes the accompanying drawings for the embodiments.

DESCRIPTION OF EMBODIMENTS

Figure 1A:
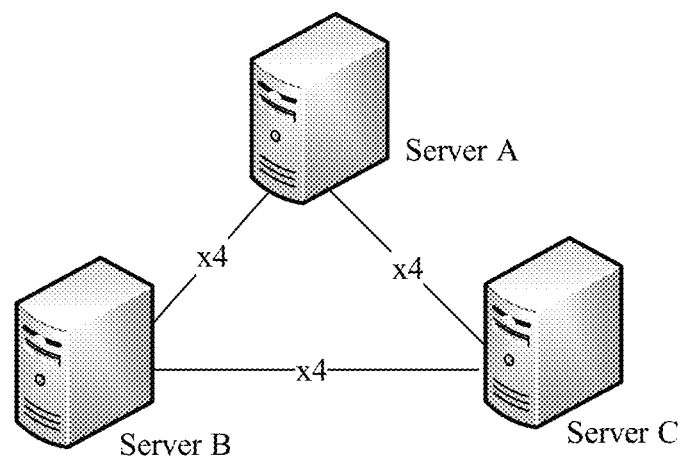
FIG. 1A is a schematic diagram of a structure of a topology in which a plurality of servers is connected to each other according to an embodiment of this application.

The following describes the solutions in the embodiments provided in this application with reference to the accompanying drawings in this application.

First, the specific terms in this application are described.

An AI chip is a module configured to process a large quantity of computing tasks in an AI application. One server may have one or more AI chips.

A network interface controller (NIC) is also referred to as a network adapter. The NIC is computer hardware designed to allow computers to communicate on a network. An NIC of a server is configured to connect one server to another server, or is configured to establish a connection between a server and a network device such as a switch.

A PCIe interface is a high-speed serial computer extended bus standard interface. The PCIe interface is used for high-speed serial point-to-point dual-path high-bandwidth transmission. A device connected to the PCIe interface is allocated exclusive path bandwidth but does not share bus bandwidth, and the PCIe interface mainly supports end-to-end reliable transmission.

A peripheral bus interface standard switch (PCIe switch) chip is a module configured to extend a PCIe link. The PCIe link uses an end-to-end connection manner, and only one device or component can be connected to each of two ends of the PCIe link. Therefore, the PCIe link needs to be extended by using the PCIe switch chip, so that a plurality of devices or components can be connected to one end of the PCIe link. The PCIe switch chip is connected to another device or component through a PCIe bus.

An HSSI interface is an extended interface that uses a serial communication manner, and includes a Universal Serial Bus (USB), a High-Definition Multimedia Interface (HDMI), a mobile industry processor interface (MIPI), and the like.

In the field of AI, as a neural network scale and a data set scale increase sharply, a large-scale neural network needs to be trained by using a large-scale training set, which is difficult to be finished based on a computing capability of one or more AI chips inside only one single server. A plurality of servers (including more AI chips) need to be used to process data in parallel. For example, a model parallel training method is used, and different network layers of a neural network model are allocated to different servers for training. After a single server completes processing data, the processed data needs to be sent to another server for training.

When a plurality of servers is used to process data in parallel, a connection between the servers can be established directly (to be specific, data transmitted between two servers does not pass through another device). Alternatively, an interconnection may be implemented through a router or a switch (to be specific, data transmitted between two servers is forwarded through a device such as a router or a switch). When the plurality of servers is directly connected to each other, any two servers can be directly connected through one or more network interface controllers (for example, NICs of any two servers are connected through a network cable). When data needs to be transmitted between any two servers, bandwidth that may be used for data transmission between the two servers is a sum of bandwidth of NICs connected to each other in the two servers. When the plurality of servers is connected through a router or a switch, maximum bandwidth that may be used for data transmission between any two servers may be a sum of bandwidth of an NIC of each server.

Figure 1B:
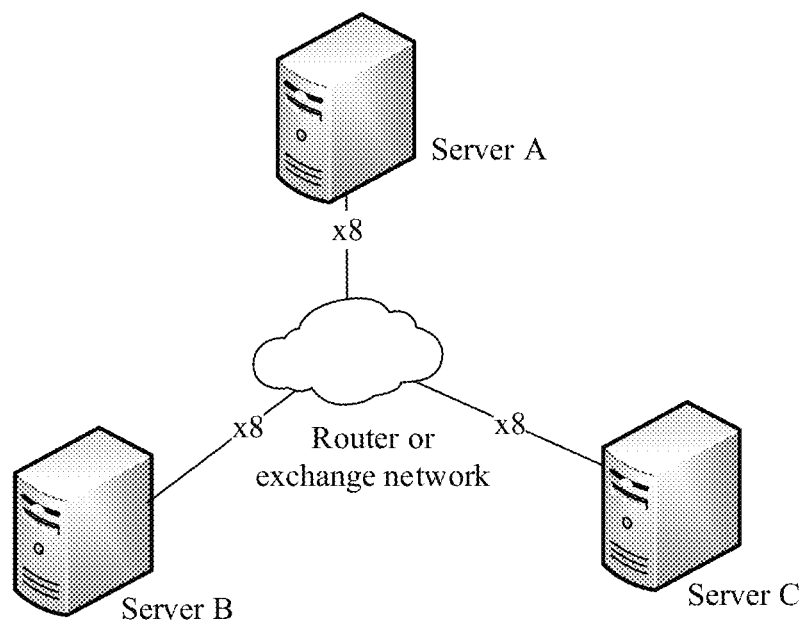
FIG. 1B is another schematic diagram of a structure of a topology in which a plurality of servers is connected to each other according to an embodiment of this application.

For example, if each server has eight NICs, three servers are directly connected to each other in a full-interconnection manner, and a network topology is shown in FIG. 1A, any two servers may be connected to each other through four NICs. Maximum bandwidth for data transmission between any two servers is a sum of bandwidth of the four NICs. When the plurality of servers is connected to each other through a router or a switch, maximum bandwidth for data transmission between any two servers may be a sum of bandwidth of an NIC of each server. FIG. 1B is a schematic diagram of connection between the three servers through a router or a switch. When data needs to be transmitted between a server A and a server B, and no data is transmitted between a server C and any one of the server A or the server B, the data may be transmitted between the server A and the server B through eight NICs. To be specific, maximum bandwidth for data transmission between any two servers is a sum of bandwidth of eight NICs. In a process of data transmission between one server and another server, key factors affecting data transmission efficiency are a data transmission path inside the server and bandwidth for data transmission between the two servers.

Figure 2:
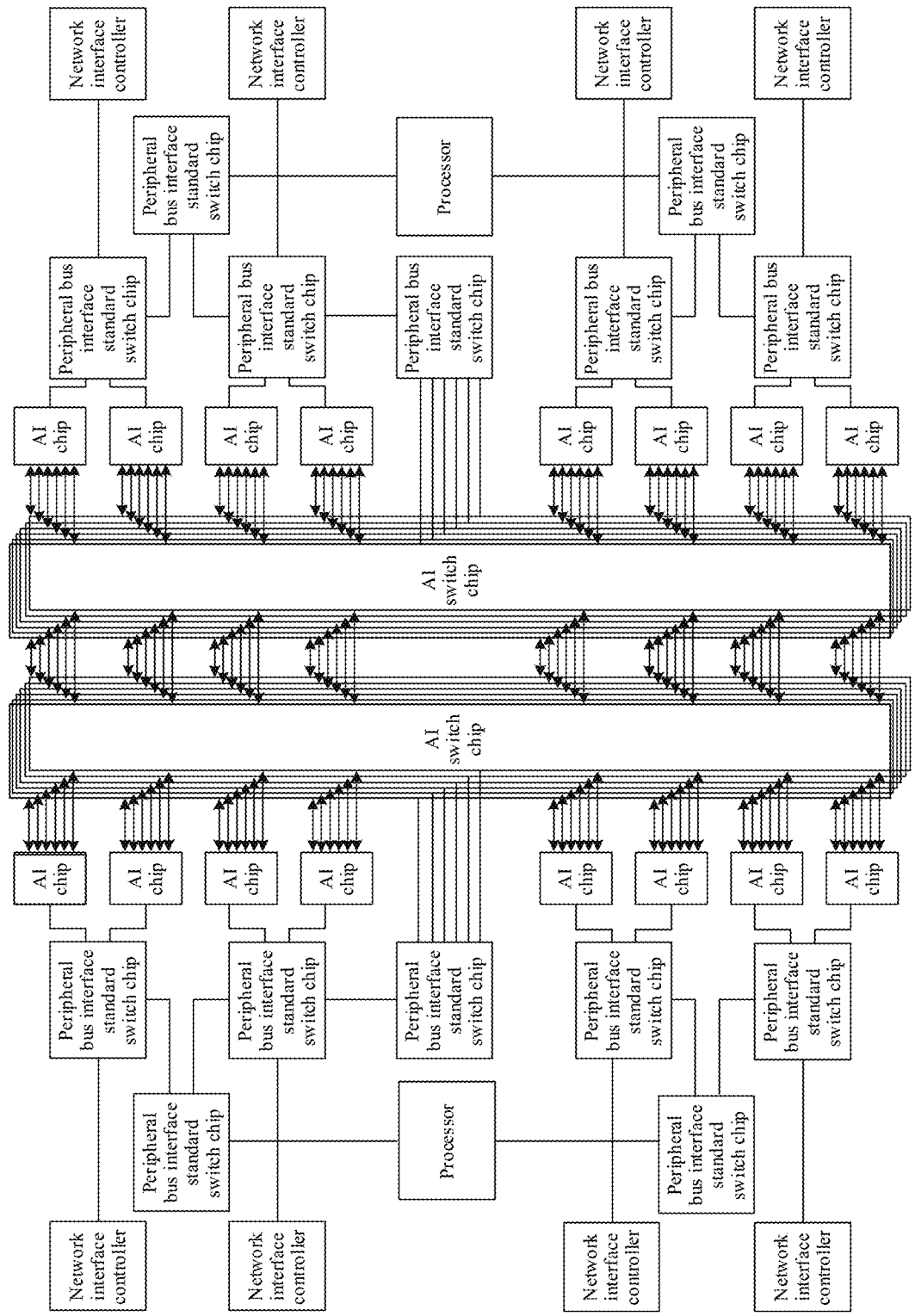
FIG. 2 is a schematic diagram of a structure of a server with a plurality of AI chips according to an embodiment of this application.

FIG. 2 is a schematic structural diagram of a server including a plurality of AI chips. The server of this type includes eight NICs and a plurality of AI switch chips. Each NIC is connected to two AI chips through one PCIe switch chip, and is connected to a processor through the PCIe switch chip. The AI switch chip is configured to implement interconnection between a plurality of AI chips inside the server, so that data exchange can be implemented between every two AI chips in the plurality of AI chips inside the server through the AI switch chip. When a server needs to send data in an AI chip to another server, an NIC receives, through the PCIe switch chip, the data sent by the AI chip, and sends the data to the other server connected to the NIC. For example, when the server shown in FIG. 2 is used to train a neural network model in coordination with another server, if one server needs to send data in an AI chip to another server, because one NIC is connected to two AI chips through one PCIe switch chip, one NIC needs to receive, through one PCIe switch chip, data sent by one or two AI chips. Data in two AI chips needs to be transmitted to a same NIC through a same PCIe switch chip. Therefore, data paths of the two AI chips have an overlap part (that is, a PCIe bus connected between the PCIe switch chip and the NIC). The data path of the AI chip is a path for transmitting data between the AI chip and the NIC. Because bandwidth of the PCIe bus is relatively small, in the server shown in FIG. 2, when a relatively large amount of data needs to be transmitted, congestion may occur on a path from the PCIe switch chip to the NIC, resulting in an increased delay of data transmission between servers. Further, the NIC receives data in one AI chip through the PCIe switch chip, or the NIC sends data to one AI chip through the PCIe switch chip, resulting in an increased delay of transmitting data between servers.

As a neural network scale and a data set scale increase sharply, when a plurality of servers is used to process data in parallel, data is frequently transmitted between the servers. If the server shown in FIG. 2 is used, one NIC needs to receive, through the PCIe switch chip, data in one or more AI chips, and transmit the data to another server. This causes a long delay of transmitting data between servers. If the delay of transmitting data between servers is long, parallel processing efficiency of the plurality of servers is reduced, and an advantage of parallel processing cannot be fully utilized.

Figure 3:
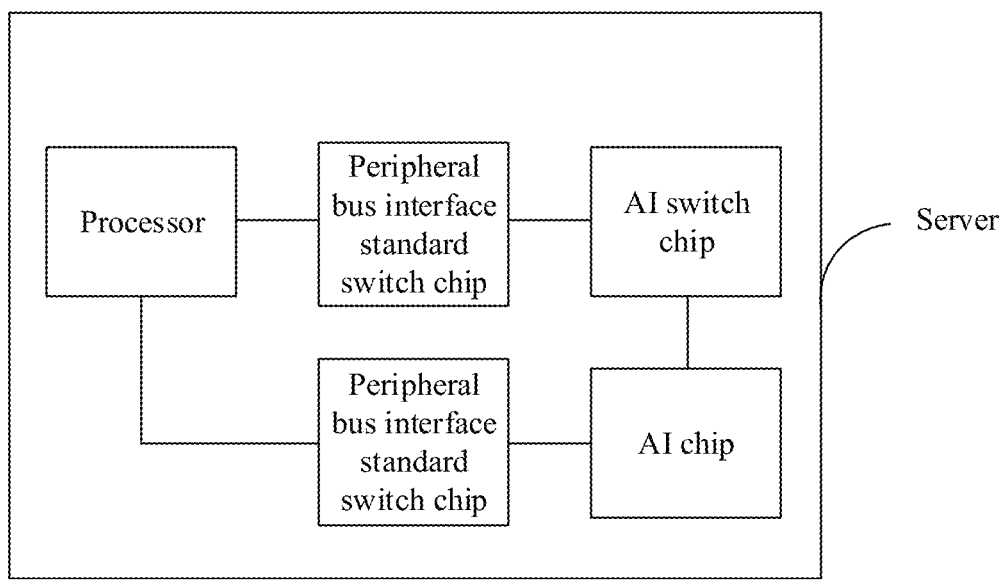
FIG. 3 is a schematic diagram of a structure of a server according to an embodiment of this application.
Figure 4:
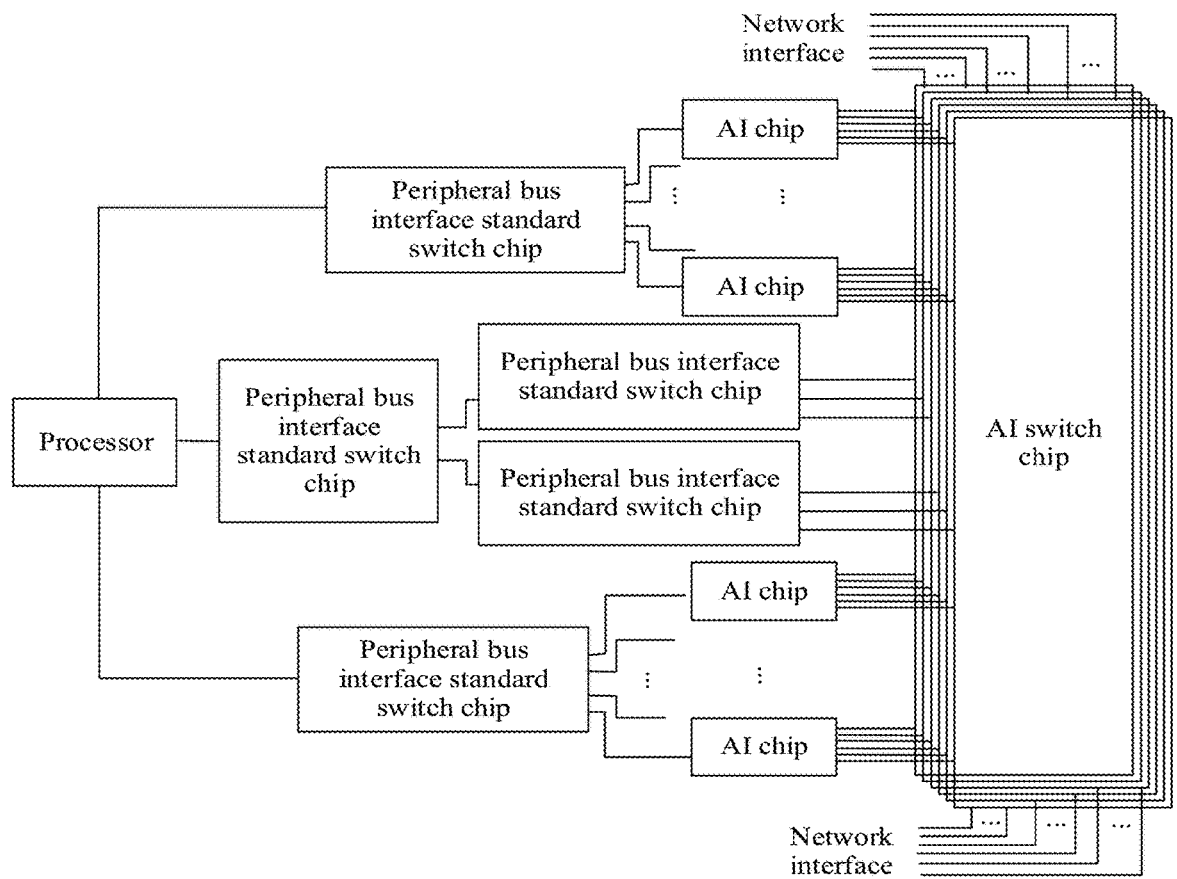
FIG. 4 is a specific schematic diagram of a structure of a server according to an embodiment of this application.
Figure 5:
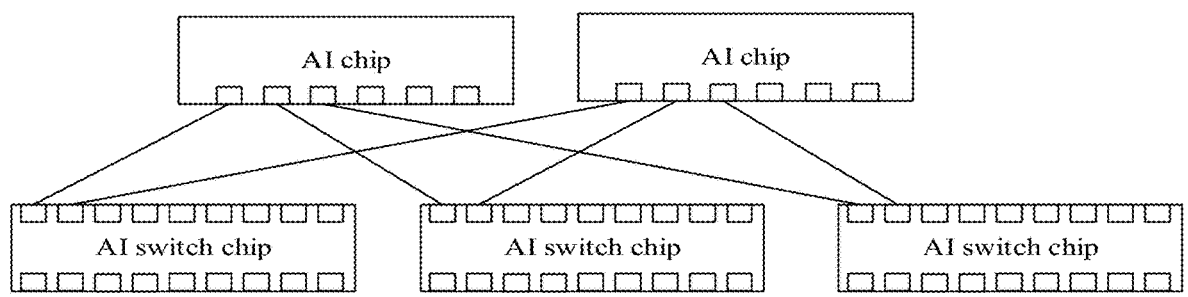
FIG. 5 is a schematic diagram of connection between an AI chip and an AI switch chip according to an embodiment of this application.

To resolve a problem that when the plurality of servers process data in parallel, a delay is long because of a low transmission speed during data transmission between servers, an embodiment of this application provides a server. The following describes the server and a data transmission method provided in this application with reference to the accompanying drawings. FIG. 3 is a schematic structural diagram of a server according to an embodiment of this application. The server includes a processor, an AI chip, an AI switch chip, and a PCIe switch chip. The processor is separately connected to the AI chip and the AI switch chip through the PCIe switch chip. The AI chip and the AI switch chip are connected through an AI interface of the AI chip and an AI interface of the AI switch chip. For example, FIG. 4 is a specific schematic structural diagram of the foregoing server according to this application. The server includes the processor, a plurality of AI chips, one or more AI switch chips, and a plurality of PCIe switch chips. The processor may be connected to the plurality of AI chips through one PCIe switch chip, and connected to a plurality of AI switch chips through the PCIe switch chip. The plurality of AI chips and the plurality of AI switch chips are separately connected to each other through an AI interface. A manner of connecting the plurality of AI chips to the plurality of AI switch chips is shown in FIG. 5. Each AI chip and each AI switch chip include a plurality of AI interfaces. Each AI chip may be connected to one AI interface of one AI switch chip through one AI interface, or may be connected to a plurality of AI interfaces of one AI switch chip through a plurality of AI interfaces. Therefore, every two AI chips in the plurality of AI chips inside the server can be connected to each other through the AI switch chip. For example, FIG. 5 is a schematic diagram of connection between any two AI chips inside a server and AI interfaces of any three AI switch chips in a plurality of AI switch chips. In the figure, each AI chip is connected to one AI interface of one AI switch chip through one AI interface. Optionally, the AI interface may be an HSSI interface, or may be another type of interface used to connect to a chip. This is not limited in this application.

Figure 6:
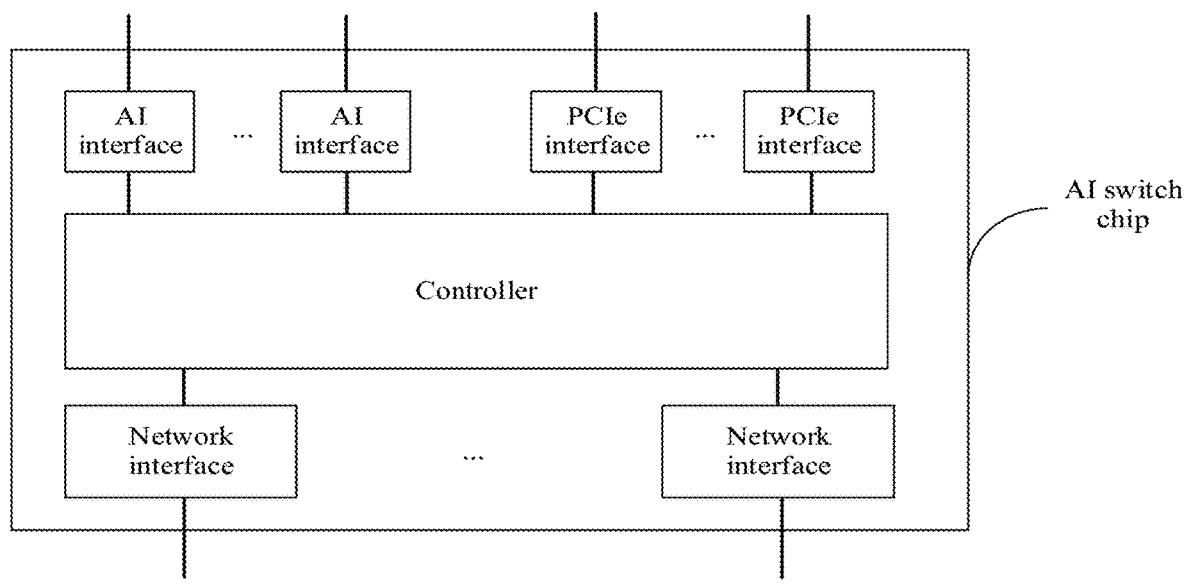
FIG. 6 is a schematic diagram of a structure of an AI switch chip according to an embodiment of this application.
Figure 7:
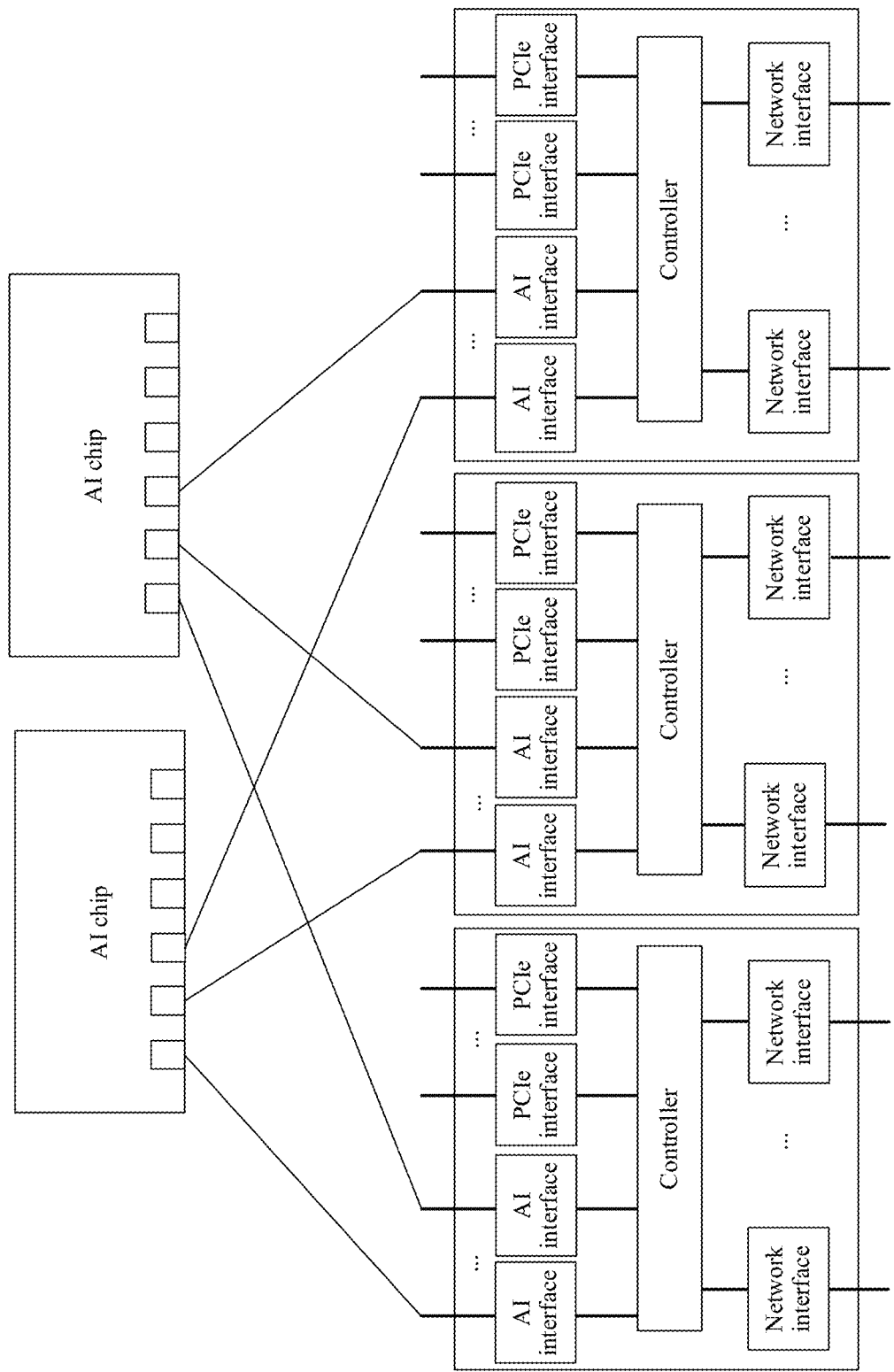
FIG. 7 is a schematic diagram of connection between an AI chip and an AI switch chip according to an embodiment of this application.

FIG. 6 is a schematic diagram of an internal structure of the foregoing AI switch chip. The AI switch chip includes a controller, one or more AI interfaces, one or more PCIe interfaces, and one or more network interfaces. The controller is separately connected to the AI interface, the PCIe interface, and the network interface. The controller receives data or control information through the AI interface, the PCIe interface, or the network interface, and sends the received data to an AI chip or another server through a specified interface. The AI interface is used by the AI switch chip to connect to a plurality of AI chips in a server, and each AI interface of the AI switch chip is connected to one AI interface of one AI chip. The controller is connected to the AI interface. The controller receives, through the AI interface, data in an AI chip, and sends, through another AI interface, the received data to an AI chip connected to the other AI interface, to implement data transmission between AI chips inside the server. Alternatively, the controller sends the received data to another server through the network interface, to implement data transmission between servers. The PCIe interface is used by the AI switch chip to connect to a processor through a PCIe switch chip connected to the PCIe interface. The network interface is used to connect a server to another server or a device such as a switch or a router, to implement data transmission between servers. When the AI switch chip is shown in FIG. 6, a manner of connecting the AI chip to the AI switch chip is shown in FIG. 7. To be specific, a plurality of AI switch chips and a plurality of AI chips are separately connected to each other through respective different AI interfaces, so that one AI switch chip can be connected to the plurality of AI chips, and the plurality of AI chips can perform data exchange inside a server or between servers. The plurality of AI switch chips can also be connected to one AI chip, so that the plurality of AI switch chips can simultaneously perform data exchange inside a server or between servers for a same AI chip.

Figure 8:
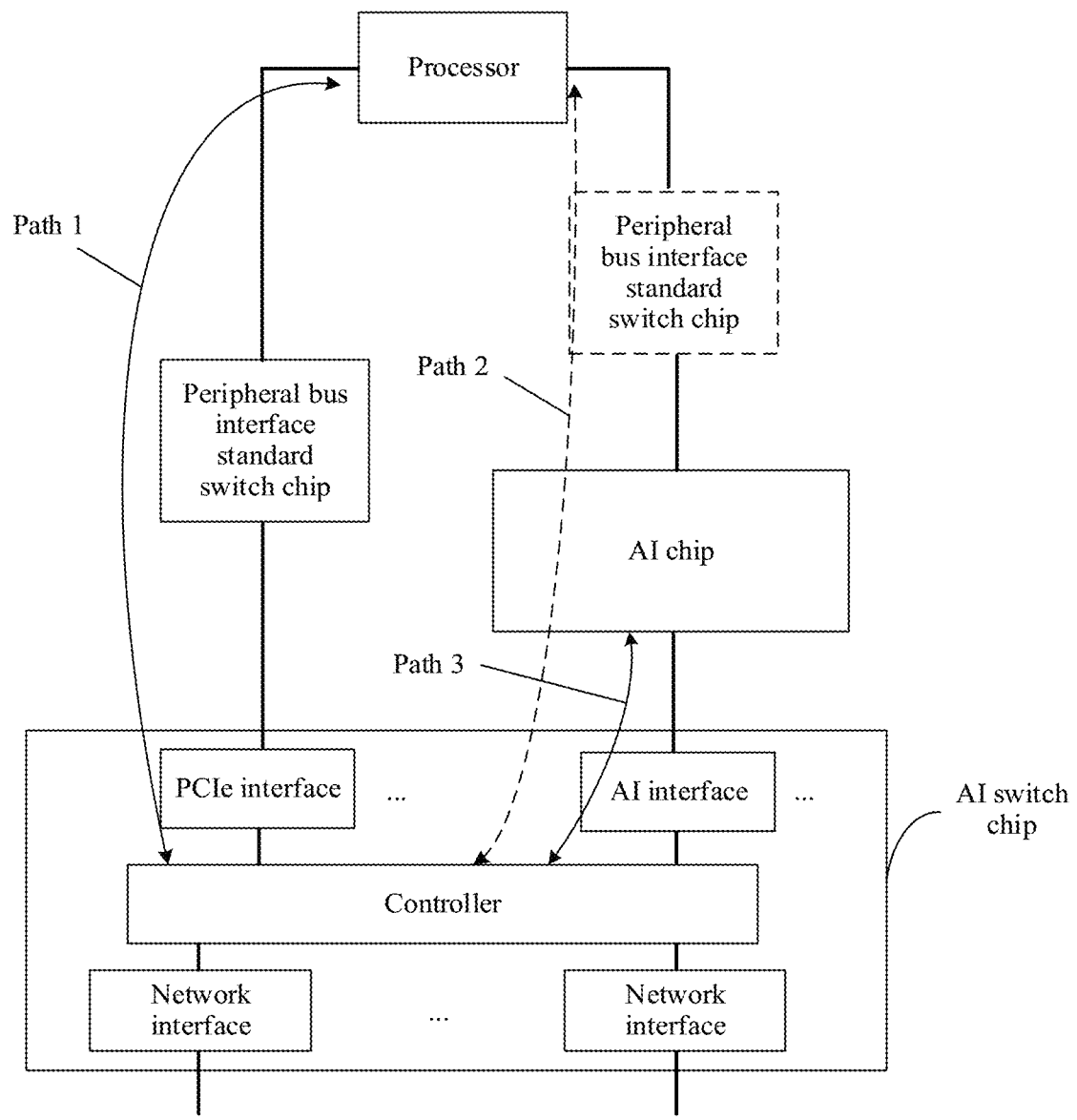
FIG. 8 is a schematic working diagram of a server according to an embodiment of this application.

FIG. 8 is a schematic working diagram of a server according to an embodiment of this application. An AI switch chip may be connected to a processor through a PCIe switch chip, or may be connected to the processor through one AI chip and one PCIe switch chip. For the AI chip, a path (that is, a path 1 in the figure) on which a controller is connected to the processor through a PCIe interface and a PCIe switch chip is referred to as a control path. The processor sends control information to the controller in the AI switch chip through the control path, and the controller receives, based on the control information, data sent by the AI chip. A path (that is, a path 3 in the figure) on which the controller is connected to the AI chip through an AI interface is referred to as a data path. Each AI chip may be connected to a controller in one AI switch chip through one AI interface to form a data path. Therefore, each AI chip may be connected to controllers in a plurality of AI switch chips through a plurality of AI interfaces to establish a plurality of data paths, and one or more controllers that receive control information may receive, through the data paths, data sent by the AI chip. It may be understood that the AI switch chip includes a plurality of AI interfaces and a plurality of PCIe interfaces. FIG. 8 only shows that one AI interface of the AI switch chip is connected to one AI chip and one PCIe interface of the AI switch chip is connected to one PCIe switch chip.

Figure 9:
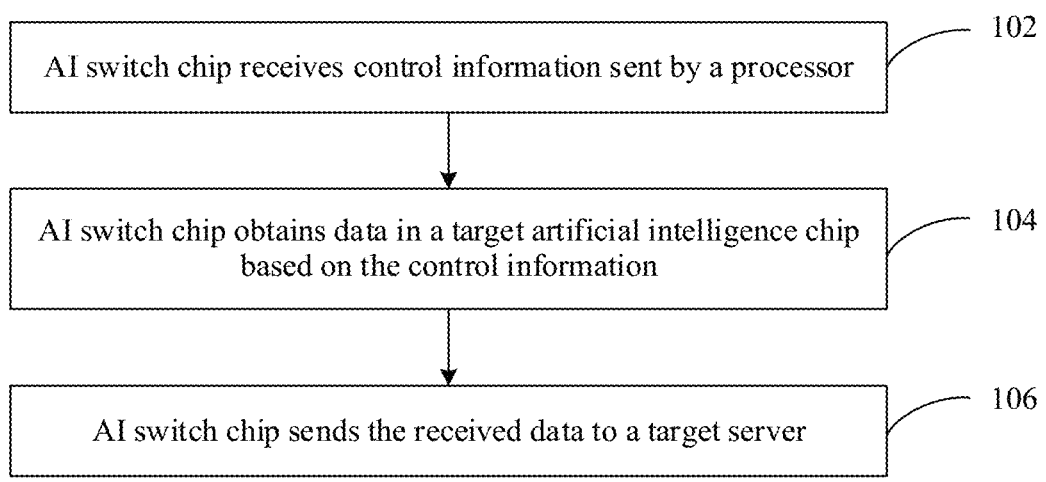
FIG. 9 is a data transmission method according to an embodiment of this application.

Based on the foregoing server, an embodiment of this application provides a data transmission method. The method is applied to a server system in which the plurality of servers is used to process data in parallel. As shown in FIG. 9, the method includes the following steps.

S102: An AI switch chip receives control information sent by a processor.

The control information is used to indicate the AI switch chip to receive data in a target AI chip through a controller. The control information includes an identifier of the target AI chip, for example, an ID of the target AI chip and an interface number of the target AI chip. The ID of the target AI chip indicates an AI chip whose data needs to be received by the AI switch chip. The interface number of the target AI chip is an AI interface connected to the target AI chip. For example, when a model parallelism method is used to train a neural network model, one server is responsible for training one network layer. When one server receives data that needs to be processed, a processor of the server allocates the received data to a plurality of AI chips in the server for processing. After one AI chip completes processing allocated data, the processor sends, through a control path, control information to a controller in one or more AI switch chips, and indicates the controller that receives the control information to receive, through an AI interface, the data sent by the target AI chip.

S104: The AI switch chip receives, based on the control information, the data sent by the target AI chip.

Because the controller is located inside the AI switch chip, the controller is connected to an AI chip through an AI interface of the AI switch chip. Therefore, the controller may receive, through the AI interface connected to the target AI chip, the data sent by the target AI chip. After receiving the control information, the controller needs to obtain the ID of the target AI chip and the interface number of the target AI chip that are in the control information, determine the target AI chip based on the ID of the target AI chip in the control information, determine, based on the interface number of the target AI chip, the AI interface connected to the target AI chip, and then receives the data sent by the target AI chip.

S106: The AI switch chip sends the received data to a target server.

After receiving the corresponding data in the target AI chip based on the control information, the AI switch chip sends, through a network interface, the received data to a target server connected to the network interface.

It should be noted that, in the foregoing data transmission method, the controller may directly receive data in an AI chip through an AI interface. As shown in FIG. 7, because the controller is connected to the AI chip through the AI interface, the controller may directly receive data in the AI chip through the AI interface. To be specific, in S104, the controller does not need to use another chip or module, and may directly receive, through the AI interface, the data sent by the AI chip. In addition, the controller is connected to a plurality of network interfaces, and data received by the controller from an AI chip may be transmitted to the target server through the plurality of network interfaces. Therefore, when the controller in the AI switch chip provided in this application receives the data from the AI chip and transmits the data, a delay is shorter and efficiency is higher.

It should be noted that, in the server provided in this application, when an AI chip needs to transmit a relatively large amount of data, controllers in a plurality of AI switch chips may be used to simultaneously receive data sent by the AI chip, and send the data to another server through network interfaces of the plurality of AI switch chips, thereby reducing a data transmission delay. As shown in FIG. 8, each AI chip is connected to each AI switch chip through an AI interface, and each AI chip can be connected to a controller in each AI switch chip through an AI interface of the AI switch chip, to form a data path with the controller in each AI switch chip. When data sent by an AI chip needs to be received, controllers in a plurality of AI switch chips connected to the AI chip may simultaneously receive the data in the AI chip. To be specific, a processor may send control information to the controllers in the plurality of AI switch chips, receive data in the target AI chip through the plurality of controllers, and then send the received data to another server through network interfaces of the plurality of AI switch chips. For example, in FIG. 8, one AI chip is connected to each of three AI switch chips through one AI interface. When data in one AI chip needs to be sent to another server, a data path may be formed between the AI chip and each of the three AI switch chips connected to the AI chip. Then the data in the AI chip is received through three data paths, and then the received data is sent to the other server through network interfaces of the three AI switch chips. Therefore, the server provided in this application can simultaneously receive data in a same AI chip through a plurality of controllers, and simultaneously send the data to another server through network interfaces of a plurality of AI switch chips. A server that receives the data may also receive the data through a plurality of network interfaces. When a same amount of data in the AI chip needs to be sent, the server provided in this application can provide greater bandwidth, and data in the AI chip can be received and sent faster, so that efficiency is higher and a delay is shorter.

Further, in the server provided in this application, when the controller needs to send data in all AI chips to another server, data in each AI chip may be transmitted to the other server through any one or more network interfaces of the AI switch chip. In the server shown in FIG. 2, one NIC needs to receive data in two AI chips, and the data in the two AI chips needs to be transmitted to the NIC through a same PCIe bus. Because bandwidth of the PCIe bus is limited, in the server shown in FIG. 2, when a large amount of data needs to be transmitted, congestion may occur on a path from a PCIe switch chip to the NIC, resulting in an increased delay of transmitting data between servers. In the server provided in this application, each AI switch chip includes one or more network interfaces, and a quantity of network interfaces may be greater than a quantity of AI chips. Therefore, when data in all AI chips needs to be sent to another server, a controller in each AI switch chip may receive data in one or more AI chips through an AI interface, and then send the received data through different network interfaces. Each AI chip has at least one corresponding network interface to send the data in the AI chip. Therefore, there will not be a problem of a long delay of transmitting data between servers because congestion occurs on a path due to an excessively large amount of data when one NIC needs to transmit data in a plurality of AI chips in the server in FIG. 2.

For example, the server provided in this application includes two AI chips and three AI switch chips, and each AI switch chip includes two network interfaces. Based on a connection relationship between the AI chip and the AI interface of the AI switch chip and an internal connection relationship of the AI switch chip that are shown in FIG. 8, all six network interfaces in the server may be connected to each AI chip and send data in the AI chip. When each AI chip is connected to each AI switch chip through only one AI interface, and data in two AI chips needs to be received simultaneously, a controller in each AI switch chip may receive the data in the two AI chips simultaneously through an AI interface connected to each AI chip. Then one network interface is used to send data in one of the AI chips, and another network interface sends data in the other AI chip. To be specific, when data in all AI chips needs to be sent to another server, each AI chip may correspondingly have at least one network interface used to send data that is in the AI chip and that is received by the controller.

It should be noted that, in the server provided in this application, a quantity of network interfaces can be set based on an actual requirement, to adapt to bandwidth for transmitting data in the AI chip. Because the controller is located inside the AI switch chip, the controller may directly access data in an AI chip through an AI interface of the AI switch chip. When a network interface in the server is set, a network interface only needs to be set in each AI switch chip, and there is no need to add a PCIe switch chip connected to the AI chip. In addition, a quantity of interfaces that are of each AI chip and that are connected to AI interfaces of the AI switch chip may remain unchanged, and only a newly added network interface and an interface connection cable between the network interface and the controller need to be added. It may be understood that, in the server shown in FIG. 2, a quantity of NICs may be increased, so that each AI chip can be connected to a plurality of NICs. However, adding one NIC needs to occupy an interface of one AI chip, and a quantity of interfaces of each AI chip is limited. In addition, both the processor and the AI chip need to be connected to the NIC through a PCIe switch chip, and a quantity of interfaces of each PCIe switch chip is limited. When a quantity of NICs is increased, a quantity of PCIe switch chips also needs to be increased. Therefore, if an NIC is added based on a structure of the server shown in FIG. 2, because a quantity of interfaces of the AI chip is limited, a limited quantity of NICs can be increased, and a large quantity of chips inside the server causes a complex structure.

The controller may be further configured to receive data sent by the processor. When receiving the data sent by the processor, the controller may receive, through two data paths simultaneously, the data sent by the processor or select a less congested data path from the two data paths to receive the data. As shown in FIG. 7, each controller may be connected to the processor only through a PCIe switch chip, and each controller is connected to an AI chip through an AI interface. The AI chip is connected to the processor through the PCIe switch chip. In this case, the controller may also be connected to the processor through the AI chip and the PCIe switch chip. Therefore, the controller may be connected to the processor through the path 1 and a path 3 in FIG. 7. The path 1 may be used as a control path, and control information sent by the processor to the controller is sent to the controller through the control path. For example, the controller sends the control information to the controller through the path 1. The path 1 may also be used as a data path. In this case, data paths between the controller and the processor include the path 1 and a path 3 in FIG. 7. When the controller needs to receive data sent by the processor, the controller may receive, through any data path of the path 1 or the path 3, the data sent by the processor, or may simultaneously receive, through the two data paths, the data sent by the processor. When the controller receives, through any one of the foregoing data paths, the data sent by the processor, the processor may obtain congestion conditions of the two data paths, and select a less congested data path to send the data to the controller. The processor can receive, through the two data paths, the data that is to be sent to the controller, or select a less congested data path from the two data paths to receive the data that is to be sent to the controller, thereby reducing a delay of sending data by the processor.

When the server provided in this application is used to process data in parallel, and one server needs to send data stored in the processor or an AI chip to another server, because the network interface is integrated inside the AI switch chip, after receiving the control information, the controller can directly receive the data in the AI chip through an interface between the AI switch chip and the AI chip, so that a time for the AI switch chip to receive the data in the processor or the AI chip can be reduced, and a time for transmitting data between servers can be reduced. Further, when the server provided in this application needs to send data in one AI chip, the server may receive data in a same AI chip through controllers in a plurality of AI switch chips, and send the data in the AI chip through network interfaces of the plurality of controllers. When data in all AI chips needs to be sent, at least one network interface can be provided for each AI chip to receive and send data in one AI chip, so that when a same amount of data is transmitted, a time for transmitting data between devices can be reduced, and efficiency of reading and transmitting data can be improved. In addition, when data in the processor needs to be sent, the processor can send the data to the AI switch chip through two data paths, or may select a less congested data path from the two data paths to send the data to the AI switch chip, so that a time for sending the data by the processor can be reduced, and a delay can be reduced.

Figure 10:
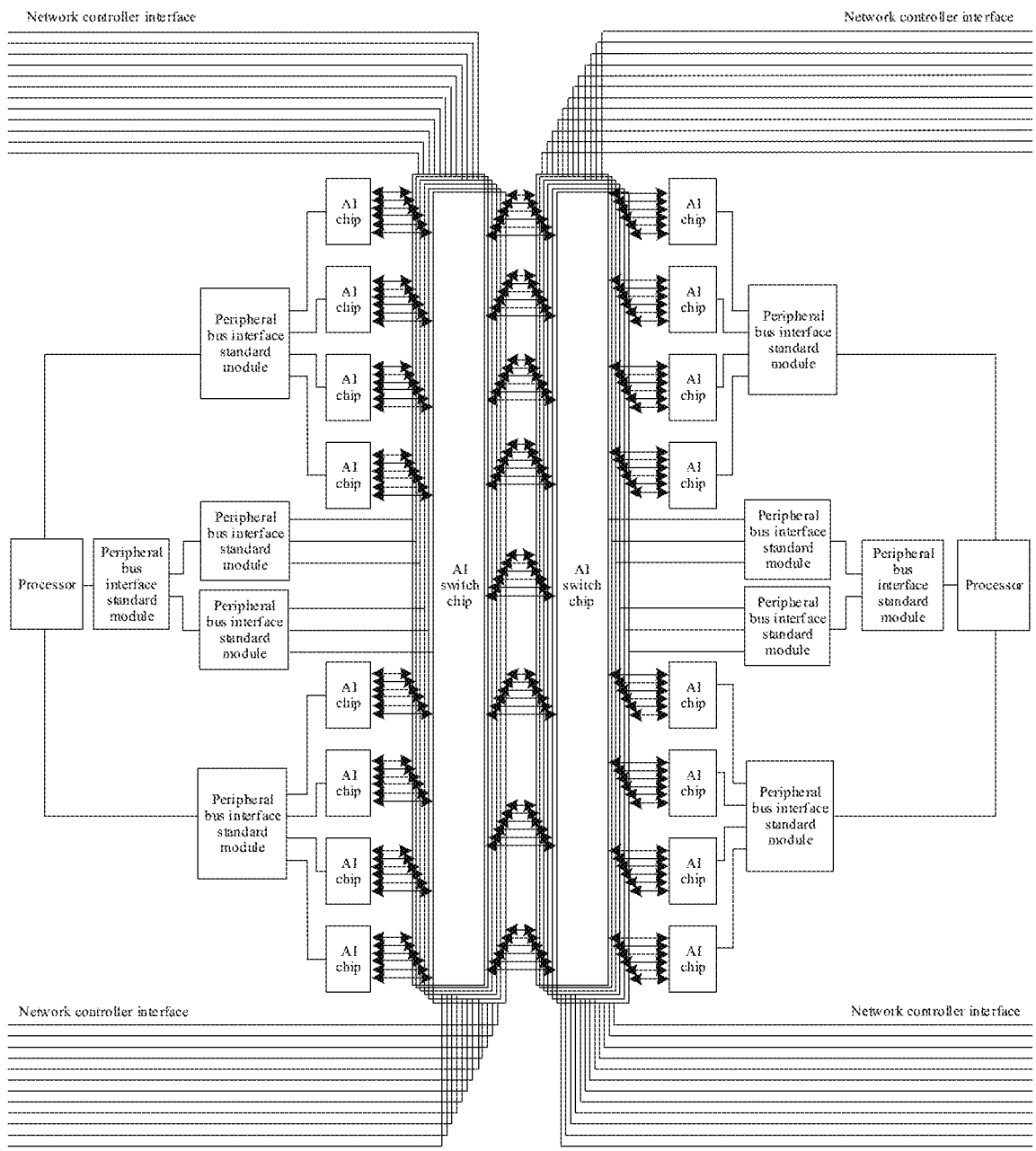
FIG. 10 is a schematic diagram of a structure of another server with a plurality of AI chips according to an embodiment of this application.

An example in which the server includes 16 AI chips and 12 AI switch chips is used in the following to analyze the structure of the server provided in this embodiment of this application and bandwidth or a delay during data transmission. FIG. 10 is a schematic diagram of a server according to an embodiment of this application. The server includes two same substrates, and each substrate includes eight AI chips and six AI switch chips. If each AI switch chip includes four network interfaces, in this case, the server provided in this embodiment of this application includes a total of 48 network interfaces. Each AI chip has six AI interfaces, each AI switch chip has 18 AI interfaces, each AI interface of each AI chip is connected to one AI switch chip, and the two substrates are connected through AI interfaces between AI switch chips. Therefore, each AI chip can be connected to 12 AI switch chips. Because each AI chip is connected to each AI switch chip through one AI interface, when data in one AI chip needs to be sent, the data can be received through six controllers in any six AI switch chips. Each AI switch chip provides one network interface to send the received data in the AI chip. When data in the 16 AI chips needs to be sent, each AI chip can receive the data in the AI chip through controllers in three AI switch chips, and send the data through one network interface of each AI switch chip. If three servers are connected in a full-connection manner shown in FIG. 1A, any two servers may be connected to each other through 24 network interfaces, and maximum bandwidth for transmitting data between any two servers is a sum of bandwidth of the 24 network interfaces. When the three servers are connected to each other through a router or a switch network shown in FIG. 1B, if data needs to be transmitted between a server A and a server B, and no data is transmitted between a server C and any one of the server A or the server B, in this case, the data may be transmitted between the server A and the server B through 48 network interfaces. To be specific, maximum bandwidth for transmitting data between any two servers may be a sum of bandwidth of the 48 network interfaces.

It should be understood that the structure of the chip or the server described in the foregoing embodiment is merely an example. A function of the chip or the server described in the foregoing embodiment may be further implemented in another manner. For example, the structure of the AI switch chip is merely division of a logical function. Actually, there may be another division manner for implementation. For example, a network adapter is used to receive data in an AI chip and send the data to another server, or a crossbar is used to implement data exchange between AI chips inside the server. In addition, in this embodiment of this application, each functional chip may be inherited in one module, or each chip may exist independently.

The foregoing description of the embodiments of this application is to describe principles of the chip and the server provided in this application by using specific examples. The foregoing embodiments are merely used to help understand a core idea of this application. For a person skilled in the art, based on the idea of this application, specific implementations and application scopes may vary. In conclusion, the content of this specification shall not be understood as a limitation on this application.

What is claimed is:

1. An artificial intelligence (AI) switch chip, comprising:
a first AI interface configured to couple to a first AI in a first server;
a first network interface configured to couple to a second server; and
a controller separately coupled to the first AI interface and the first network interface and configured to:
receive, from a processor of the first server and through the first AI interface, control information, wherein the control information instructs the AI switch chip to receive first data of the first AI chip, wherein the control information comprises an identifier (ID) of the first AI chip and an interface number of the first AI chip;
obtain, based on the control information, information of the first AI chip based on the ID;
obtain, based on the control information, information of the first AI interface connected to the first AI chip;
receive, through the first AI interface and from the first AI chip, the first data based on the control information; and
send the first data to the second server through the first network interface.

2. The AI switch chip of claim 1, further comprising a Peripheral Component Interconnect Express (PCIe) interface coupled to the controller and configured to couple to the processor in the first server, wherein the controller is further configured to:
receive, through the PCIe interface and from the processor, control information carrying an identifier of the first AI chip; and
further receive, through the first AI interface and from the first AI chip, the first data based on the identifier.

3. The AI switch chip of claim 1, further comprising a second network interface configured to couple to the second server, wherein the controller is further configured to:
receive, through the first AI interface and from the first AI chip, second data; and
send the second data to the second server through the second network interface.

4. The AI switch chip of claim 1, wherein the AI switch chip is configured to couple to the processor in the first server through the first AI chip, and wherein the controller is further configured to:
receive, through the first AI interface and the first AI chip, third data from the processor; and
send the third data to the second server through the first network interface.

5. The AI switch chip of claim 1, further comprising a second AI interface, wherein the controller is further configured to:
receive, through the first AI interface and from the first AI chip, fourth data; and
send the fourth data to a second AI chip in the first server through the second AI interface.

6. The AI switch chip of claim 1, wherein the first AI interface is a High-Speed Serial Interface (HSSI).

7. The AI switch chip of claim 1, wherein the first AI interface is a Universal Serial Bus (USB) interface.

8. The AI switch chip of claim 1, wherein the first AI interface is a High-Definition Multimedia Interface (HDMI).

9. The AI switch chip of claim 1, wherein the first AI interface is a mobile industry processor interface (MIPI).

10. A first server comprising:
a plurality of artificial intelligence (AI) chips comprising a first AI chip, wherein the first AI chip has an identifier (ID);
a processor configured to send control information; and
an AI switch chip comprising:
   a Peripheral Component Interconnect Express (PCIe) interface;
   a first network interface; and
   a plurality of AI interfaces comprising a first AI interface,
   wherein the AI switch chip is coupled to the processor through the PCIe interface and is separately coupled to a plurality of AI chips through the AI interfaces, and
   wherein the AI switch chip is configured to:
   receive, through the PCIe interface and from the processor, the control information, wherein the control information instructs the AI switch chip to receive first data of the first AI chip, wherein the control information comprises an identifier (ID) of the first AI chip and an interface number of the first AI chip;
   obtain, based on the control information, information of the first AI chip based on the ID;
   obtain, based on the control information, information of the first AI interface connected to the first AI chip;
   receive, through the first AI interface and from the first AI chip, the first data based on the control information; and
   send the first data to a second server through the first network interface.

11. The first server of claim 10, wherein the AI switch chip further comprises a second network interface configured to couple to the second server, and wherein the AI switch chip is further configured to:
   receive, through the first AI interface and from the first AI chip, second data; and
   send the second data to the second server through the second network interface.

12. The first server of claim 10, wherein the AI switch chip is further coupled to the processor through the first AI chip, and wherein the AI switch chip is further configured to:
   receive, through the first AI interface and the first AI chip, third data from the processor; and
   send the third data to the second server through the first network interface.

13. The first server of claim 12, wherein the processor is further configured to:
   determine that data congestion exists on a path on which the processor is coupled to the PCIe interface; and
   send the third data to the AI switch chip through the first AI chip based on a determination that the data congestion exists.

14. The first server of claim 10, wherein the AI switch chip is further configured to:
   receive fourth data in the first AI chip through a second AI interface; and
   send the fourth data to a second AI chip in the AI chips.

15. The first server of claim 10, wherein the first AI interface is a High-Speed Serial Interface (HSSI).

16. The first server of claim 10, wherein the first AI interface is a Universal Serial Bus (USB) interface, a High-Definition Multimedia Interface (HDMI), or a mobile industry processor interface (MIPI).

17. A method for data transmission comprising:
   receiving, by an artificial intelligence (AI) switch chip of a first server, control information from a processor of the first server, wherein the control information comprises an identifier (ID) of a first AI chip and an interface number of the first AI chip, wherein the first AI chip is any one of the AI chips, and wherein the control information instructs the AI switch chip to receive first data of the first AI chip;
   receiving, by the AI switch chip and through a first AI interface of the AI switch chip, the first data from the first AI chip based on the control information; and
   sending, by the AI switch chip, the first data to a second server through a first network interface of the AI switch chip.

18. The method of claim 17, further comprising:
   receiving, by the AI switch chip through the first AI interface, second data from the first AI chip; and
   sending, by the AI switch chip, the second data to the second server through a second network interface of the AI switch chip, wherein the second network interface is configured to couple to the second server.

19. The method of claim 17, further comprising:
   receiving, by the AI switch chip through the first AI interface and the first AI chip, third data from the processor, wherein the AI switch chip is further configured to couple to the processor through the first AI chip; and
   sending, by the AI switch chip, the third data to the second server through the first network interface.

20. The method of claim 19, further comprising:
   determining, by the processor, that data congestion exists on a path on which the processor is coupled through a Peripheral Component Interconnect Express (PCIe) interface; and
   sending, by the processor, the third data to the AI switch chip through the first AI chip based on a determination that the data congestion exists.

* * * * *